Aug. 5, 1958
P. R. SONNEMAN ET AL
2,846,095
POWER LOADER
Filed Sept. 9, 1954
3 Sheets-Sheet 1
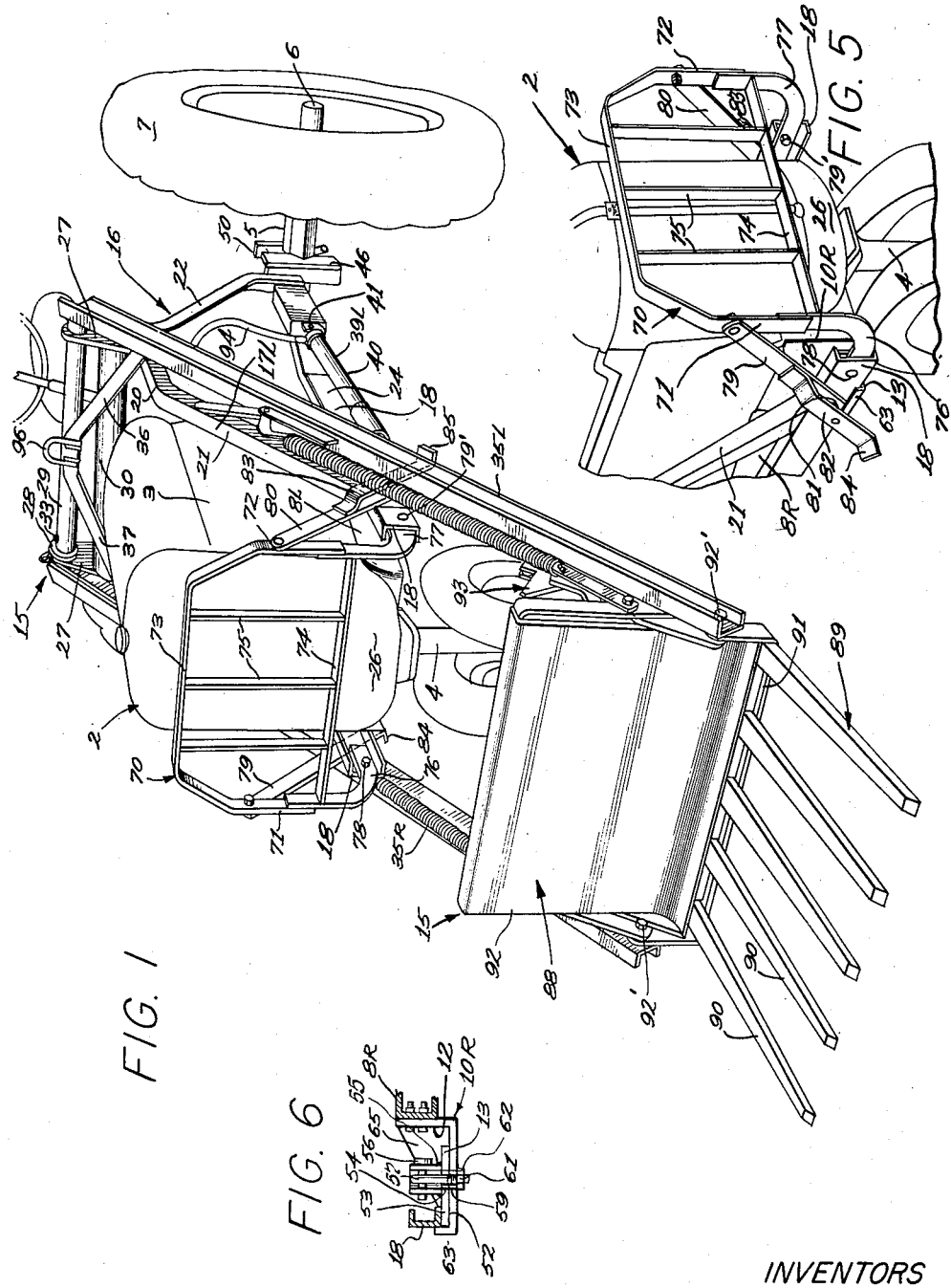
INVENTORS
PAUL R. SONNEMAN
WILLARD I. NEESE
Paul O. Pippel
ATTORNEY

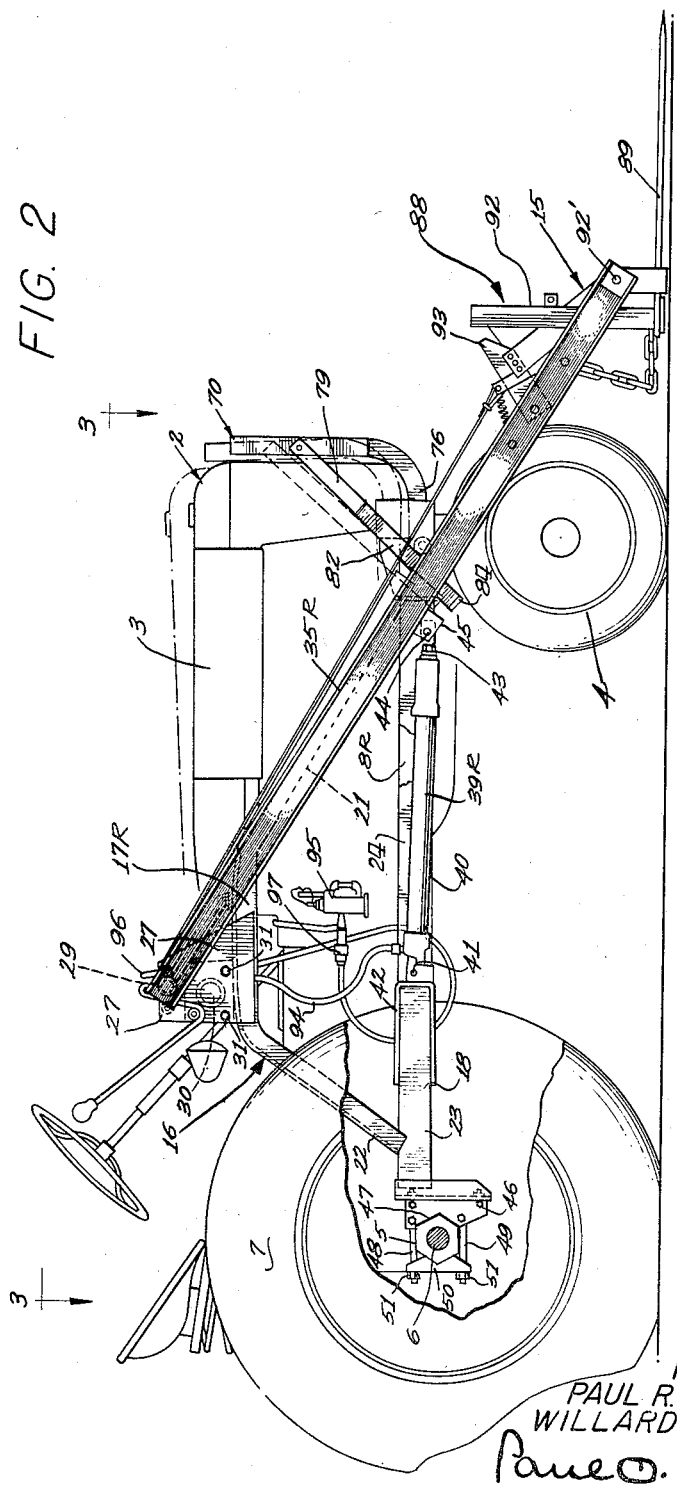

Aug. 5, 1958   P. R. SONNEMAN ET AL   2,846,095
POWER LOADER
Filed Sept. 9, 1954   3 Sheets-Sheet 3
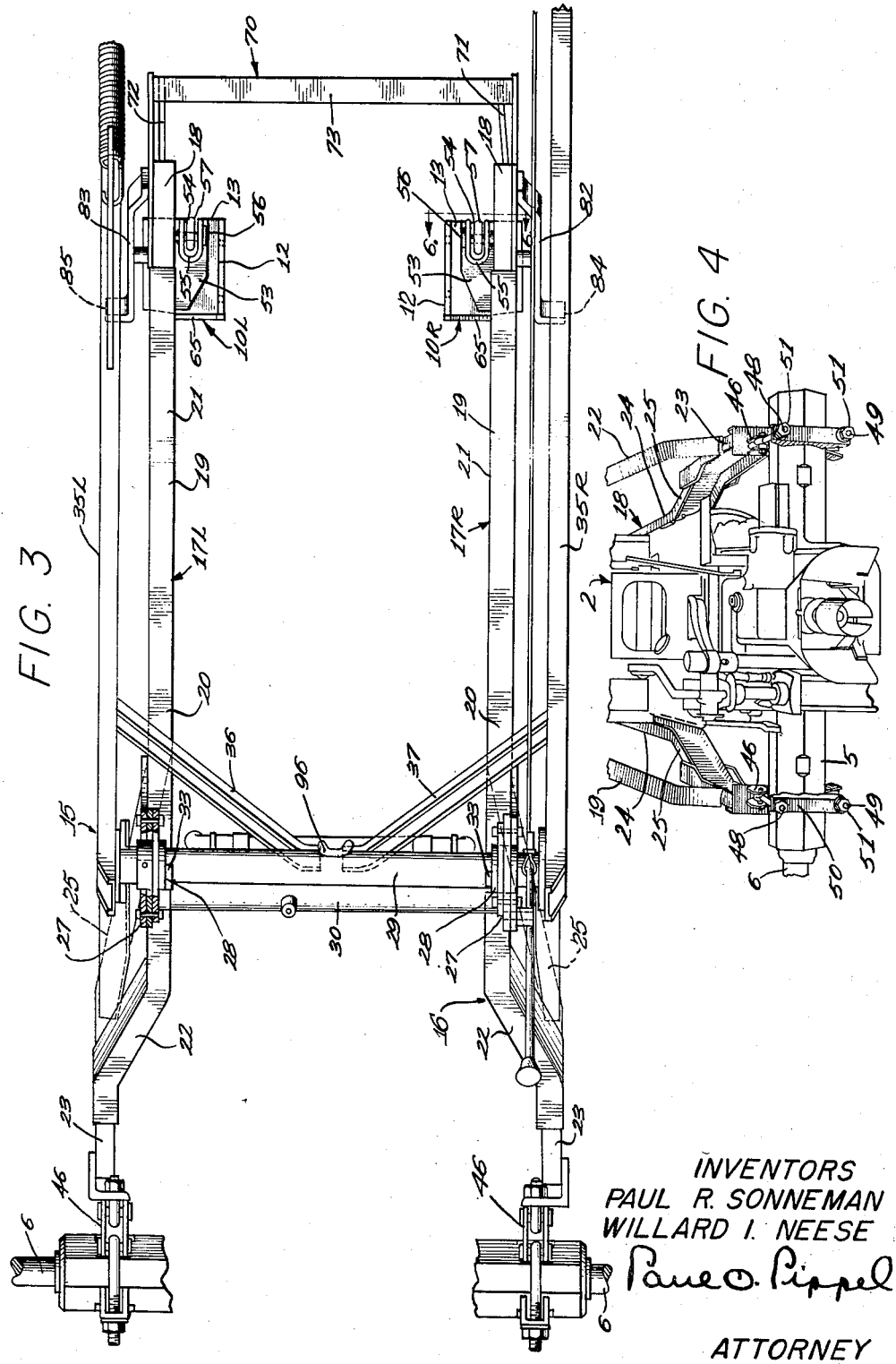
INVENTORS
PAUL R. SONNEMAN
WILLARD I. NEESE
Paul O. Pippel
ATTORNEY

United States Patent Office 2,846,095
Patented Aug. 5, 1958

2,846,095

POWER LOADER

Paul R. Sonneman, Sterling, Ill., and Willard I. Neese, Albuquerque, N. Mex., assignors to International Harvester Company, a corporation of New Jersey Application September 9, 1954, Serial No. 455,015

4 Claims. (Cl. 214—140)

This invention relates to power loaders, and more specifically, to a load-lifting attachment for a conventional tractor.

A general object of the invention is to provide a novel power loader incorporating a frame which may be readily connected and disconnected with respect to an associated tractor in a matter of a few minutes.

A further object of the invention is to devise such a loader wherein the leverage forces are so organized as to effect an upward lift of the front end of the tractor when the material receiver of the power loader is bucked into a load so that the front end of the tractor is not run over unstable material-covered terrain.

A more specific object, in relation to the immediately preceding one, is the provision of a novel stop arrangement for limiting the upward movement of the tractor and effecting an upward jarring of the material receiver to obtain a more effective bite into the material.

The invention further contemplates the provision of a support framework for the loader which incorporates a pair of side frames having rearwardly diverging rear extremities designed to guide the front end of a tractor upon which the frame is adapted to be mounted when the tractor is moved into the framework.

These and other objects of the invention will become more apparent from the specification and the drawings, wherein:

Figure 1 is a front perspective view of the power loader shown in association with the tractor;

Figure 2 is a side-elevational view of the assembly with portions of the near rear wheel broken away in order to more clearly show the connection of the loader framework to the rear axle, the views also showing the upward rearing of the tractor in phantom lines;

Figure 3 is a fragmentary enlarged plan view of the loader framework on line 3—3 of Figure 1 with the tractor rear axle also fragmentarily shown;

Figure 4 is a fragmentary rear-perspective view of the loader framework in association with the tractor fragmentarily shown;

Figure 5 is a further fragmentary front perspective view of the support framework shown mounted on the tractor; and Figure 6 is a vertical cross-sectional view taken substantially on the line 6—6 of Figure 3.

Describing the invention in detail, the tractor, generally designated 2, is of conventional design including a longitudinal body 3 provided with a front steering truck 4 and a transverse rear axle structure, or housing, 5 of hexagonal cross section, and the housing 5 carrying axles 6 which mount traction wheels 7. The tractor incorporates side sills 8R and 8L at opposite right and left sides thereof to which are bolted support brackets 10R and 10L (Figure 3) adjacent to the front end of the tractor, each bracket being substantially L-shaped in cross section and having a substantially vertical mounting-plate portion 12 adapted to be bolted to the adjacent related sill and having a substantially horizontal outwardly extending plate portion 13.

The power loader, generally designated 15, comprises a support framework, generally indicated 16, which is adapted to be mounted on the tractor as hereinafter described, and the support framework 16 comprises right and left side frame members, indicated 17R and 17L, which are symmetrical and each comprising a fore and aft extending bottom tension member 18 which carries an inverted substantially U-shaped channel arch compression member 19, the compression member 19 including a generally horizontal intermediate portion 20 which is spaced vertically above, as respects the related channel-shaped tension member 18, and the forward extremity of the portion 20 merges into a downwardly and forwardly sloping leg portion 21 which at its lower end is connected to the top side of the related channel beam member 18 adjacent to the forward end thereof, and the rear extremity of the portion 20 is continued into a downwardly and rearwardly inclined leg portion 22 which merges and connects with the rear extremity 23 of the related member 18. The connections between the tension and compression members are preferably in the form of weldments. It will be readily observed from a consideration of Figures 3 and 4 that the rear end portion 23 of each member 18 is offset outwardly with respect to the main portion 24 of the beam member 18, and is interconnected therewith by a diagonal portion 25.

From a consideration of Figures 3 and 4, it will be readily apparent that the rear legs 22 in addition to sloping downwardly and rearwardly also slope outwardly and downward from the principal plane of the side frame, and that this relationship defines a rearwardly flaring or widening space which is formed by the rearward divergence of the rear extremities of the side frame members. This construction obtains a novel guide for the front end 26 of the tractor 2 in assemblying the loader with the tractor, as hereinafter described.

The portions 20, at their juncture with the legs 22, are connected to upwardly extending standards in the form of plates 27, each of which supports a transverse bearing 28 through which is journalled a cross-shaft 29. Immediately below the cross-shaft 29 there is positioned a transverse tubular connector 30 which at opposite ends is connected, as by bolts 31, to the respective plates 27 and interconnecting the two side frames.

The cross-shaft 29 is provided intermediate the bearings 28, 28 with stops 33 preferably welded thereto, which limit through abutment with respective bearings 28 axial movement of the shaft.

The outer extremities of the shaft 29 extend outwardly of the frames 17L and 17R and thereat are connected to the rear extremities of forwardly extending booms or channel-shaped push arms 35L and 35R, and the rear end portions of the arms 35L and 35R are interconnected with the cross-shaft 29 by means of the diagonals 36 and 37. The arms 35L and 35R are located substantially in the planes of the end portions 23 of the respective side members 17L and 17R, as best seen in Figure 3, and are in vertical alignment, respectively, with hydraulic motors, or rams, 39R and 39L, each of which comprises a cylinder 40 which at its rear end is pivotally connected, as at 41, on a substantially horizontal axis to the mounting hinge 42 which serves as a continuation of the forward end of the rear portion 23 and connected thereto as by welding. The cylinder 40 of each ram has a piston operating therein which includes the stem 43 projecting from the forward end of the cylinder 40 and pivoted, as at 44, on a substantially horizontal axis to a depending lug structure 45 integrally connected with the related boom 35L or 35R intermediate the ends thereof.

The rear extremities of the portions 23 are connected with jaw portions 46, each of which has a V-shaped notch 47 complementally receiving the forward side of the related axle housing 5, the upper and lower ends of the jaw portion 46 being connected to the forward ends of a pair of bolts 48 and 49 which overlie and underlie the respective axle portion 5 and project rearwardly therefrom and connect with the upper and lower ends of a mating jaw 50 which engages the back side of the housing portion 5 and is held thereagainst by means of the nuts 51 threaded on the bolts 48, 49.

The forward ends of the side frames 17R and 17L are provided with integral inwardly extending mounting plates 53 (Figure 3), the plates 53 being preferably weld connected to the underside of the related beam member 18 adjacent to its forward end and seating, as at 52 (Figure 6), against the top side of the mounting plate 13 of the related bracket (namely, the mounting plate 53 of the side frame 17L seats on the plate 13 of the left-hand mounting bracket 10L, and the plate 53 of the right-hand frame 17R seat on the plate 13 of the bracket 10R). Each mounting plate portion 53 is provided with a forwardly open U-shaped slot 54 which is surrounded by a similar upstanding forwardly open U-shaped flange 55 which carries by means of a pin 56 a depending bolt 57 which extends through the slot 54 and through a registering forwardly open U-shaped slot 59 in the related mounting plate 13 and the lower end of the bolt 57 is provided with a threaded end receiving a nut 61 which bears, as at 62, against the underside of the related plate 13 and provides a quick attachable securement for the forward end of the related side frame to the mounting bracket on the tractor. It will be observed from a consideration of Figure 6 that the outboard end, or edge, of each plate 13 is provided with an upturned lip, or flange, 63 which engages the outboard side of the angle beam member 18 in order to provide a guide and confinement for the same. It will also be observed from a consideration of Figure 6 that the plate 13 is reinforced in connection with the plate 12 by means of a diagonal gusset plate 65 interconnecting the same, said gusset plates forming a stop for the rear edges of the plates 53.

It will be seen from a consideration of Figures 1, 2, and 5 that the forward end of the support structure is provided with a grille guard 70, which is a rectangular open frame extending transversely across the forward end 26 of the tractor and the frame includes a pair of depending legs or side members 71 and 72 interconnected by top and bottom transverse braces 73 and 74, the braces 73 and 74 being interconnected by vertical struts 75. The vertical members 71 and 72 are disposed outwardly of the lateral extremes of the front end 26 of the tractor and at their lower ends are provided with rearward extending stub end portions 76 and 77 which are connected, as by bolts 78 and 79', to the forward ends of the respective beam members 18 and project within the channels thereof. The vertical side columns 71 and 72 are connected to the upper ends of diagonal brace members 79 and 80 which at their lower ends extend along the external surfaces of the respective beams 18 and are connected therewith, as by means of a bolt 81. The brace members 79 and 80 are provided with outwardly offset downwardly and rearwardly extending stop members 82 and 83 which extend along the inner sides of the angle push arms 35R and 35L, respectively, and the lower ends of these members 82 and 83 are formed with stops, or abutments, 84 and 85, respectively, which underlie the respective arms 35R and 35L intermediate the ends thereof and limit their downward movement attendant to the tractor rising upwardly when the work-engaging means, generally designated 88, is bucked into a load, the tractor pivoting or rearing about the axis of the axle 6 and the cross-shaft 29.

Inasmuch as the work-engaging member, scoop or bucket, 88 per se forms no part of the present invention, it will be only generally described and it will be understood that is comprises in the present instance, merely for purposes of illustration, a buckrake 89 which includes the series of laterally spaced teeth 90 interconnected at their rear ends by a cross-frame 91 which includes an upright back panel 92 and the opposite extremes of the framework 91 being pivotally connected, as at 92', to the forward ends of the boom members 35R and 35L and the bucket, or work-receiver member, 88 being associated with a conventional dumping mechanism 93, such as will be readily understood by those skilled in the art.

It will be seen that the member 30 which interconnects the side frames 17L and 17R also forms a reservoir for hydraulic fluid and that the same is connected with the cylinders 40 by means of conduit 94 and to a distribution valve 95 which is operated by the conventional touch-control system, as will readily be understood by those skilled in the art, and which is more fully explained in U. S. Patent No. 2,573,943 or 2,524,055.

It will also be observed from a consideration of Figures 1 and 3, the cross-member, or shaft, 29 is provided intermediate its ends in-between the inner ends of the diagonals 36 and 37 which connect the medial portion of the shaft 29 with the end portions of the side arms 35L and 35R with an eye 96 which is adapted to be engaged by a suitable crane for holding the entire frame structure off the ground, for the purpose of assembly and disassembly with respect to the tractor.

It will be readily apparent that extension of the cylinders 39R and 39L will pivot the booms 35R and 35L about the axis of the cross-shaft 29, therefore raising the load; and that retraction of the same cylinders will, of course, lower these arms.

In order to assemble or disassemble the power loader from the tractor, and considering the mechanism as assembled with the tractor as shown in the drawings, the operator would initially apply a crane to hook onto the eye 96 to support the framework. The next step would involve merely removal of the nuts 51, 51 and the rear jaws 50 from the rear attaching assemblies to disengage the rear ends of the support framework from the rear axle and then the nuts 61 of the forward bolts would be loosened. Then the entire rear end of the assembly would merely be lifted upwardly in order to clear the cross-shaft, with respect to the upper portion of the longitudinal body, and then the tractor would be backed away.

In order to reassemble, of course the loader would be in the last-mentioned position when disassembled (that is, the rear end would be raised off the ground either by the crane of by suitable jacks under the beams 35R and 35L and the tractor would be merely driven in-between the side frames), and it will be noted that the side sill portions of the tractor would guide the same from the widened rear end of the loader frame structure into the narrow forward end thereof, with the supports 10R and 10L sliding under the respective beam members 18, 18 until the forward jaws 46 of the rear attaching means abut against the axle. In the meantime, the depending bolts 57 shall have entered the slots 59 of the plates 13 of the mounting brackets 10R and 10L. Thereupon the jaws 50 would be applied and connected with the rear ends of the loader and the nuts 51 tightened. It will be understood that the hydraulic lines 94 have a quick coupling and uncoupling connection, as at 97, with the tractor hydraulic system so that the same may be disconnected or connected, as necessity dictates.

It will be understood that the specific forms of the inventions herein disclosed are merely by way of illustration and not limitation, and that the scope is to be governed only by the nature of the appended claims.

What is claimed is:

1. In an attachment for a tractor, the combination of: means including a frame structure for attachment to a tractor and providing a horizontal transverse axis intermediate the ends of the tractor; a pair of forwardly and downwardly extending, lifting arms adapted to be disposed at opposite sides of the tractor, each lifting arm being pivoted at one end at said horizontal axis and pivotally connected at the front end to a work-engaging means; a pair of normally horizontally disposed hydraulically actuated means, each pivotally connected at one end to said frame structure below said horizontal axis and pivotally connected at the other end to an associated arm intermediate its ends; and abutment means connected to said frame structure and projecting outwardly from the tractor and spaced below respective arms in limiting relationship to downward movement of said arms, said arms movable in normal operation downwardly to said abutment means attendant to bucking of said work-engaging means into a load and upward rearing of the tractor, said abutment means disposed rearwardly of the front end of the tractor at opposite sides thereof and each comprising a downwardly and rearwardly extending portion mounted upon the frame alongside the related arm intermediate the ends thereof, and an outwardly projecting portion below the respective arm.

2. A loading attachment for a tractor of the type having a longitudinal body and a transverse rear axle housing with wheels on its outward ends; a pair of support brackets connected to said body adjacent to the forward end thereof and having laterally outwardly projecting mounting portions; an auxiliary supporting structure comprising a pair of upright side frames positioned at opposite sides of said body and each having a longitudinally extending beam member including a forward part generally paralleling said body and seated on the related bracket mounting portion and having an outwardly offset rear part; quick attaching means for connecting the forward part of each beam with its associated bracket mounting portion; said side frames having outwardly offset rear extremities for positioning proximate to said rear axle housing and providing a rearwardly widening access space for guiding an associated tractor between said side frames; quick attaching means on said rear parts of said beams for connecting the rear extremity of each side frame to said axle housing proximate the outer end of the latter; said side frames having upper portions projecting above said body; means including a cross-shaft interconnecting said upper portions of said side frames; a pair of lifting arms having rear ends pivotally connected to said shaft and disposed outwardly of said side frame; material-receiving means connected to the opposite ends of said arms; and a hydraulic piston and cylinder assembly disposed beneath each arm in substantially vertical alignment therewith and connected at one end to the beam of the related side frame at said rear portion and at the other end to the adjacent arm, and guide and stop means mounted upon each of said longitudinal beam members of said supporting structure and each including a strap extending downwardly and rearwardly inwardly along the adjacent lifting arm in paralleling relation to the path of movement thereof and having an outwardly extending lug on the lower end of the strap underposed with respect to the related arm and positioned for abutment therewith at a point adjacent to its connection with the associated assembly.

3. A tractor-mounted load-moving machine, comprising an elongated body having supporting wheels at its front and rear ends and including a support frame; a pair of load-lifting arms pivoted to said support frame on an axis generally parallel to the operational axis of said rear wheels; work-engaging means carried by said arms ahead of said front end of said tractor; ram means connected to each of said arms at a point intermediate the ends thereof; and abutment means connected to said frame and extending under said arms and vertically spaced therefrom in the normal lowered position of said arms; said abutment means disposed rearwardly of the front end of the tractor and engageable with said arms immediately adjacent to said connections thereof at said points to said ram means to limit upward movement of said tractor.

4. A front end loader for a self-propelled vehicle having in combination a pair of rigidly connected laterally spaced truss-type side frames, each including an upwardly humped arch member and a longitudinal member extending between and interconnecting opposite ends of the arch member; means removably connecting said longitudinal member at its front and rear ends with the vehicle; said frames having rear extremities offset outwardly from each other to provide a rearwardly widened space for guiding the vehicle between said side frames; a pair of fore and aft extending booms disposed outwardly of said side frames; means pivotally mounting the rear ends of said booms on the upper portions of said arch members; said booms extending forwardly of the vehicle; a receiver connected to the front ends of said booms; and ram means connected between the outwardly offset portions of said frames and respective booms in substantially vertical alignment therewith, and said means removably connecting the front ends of each frame with the vehicle, comprising a bracket on each side of the vehicle including a substantially horizontal outwardly extending plate portion with a forwardly open notch, and an inwardly extending plate on the forward end of each longitudinal beam member adapted to overlie the related mounting plate and having a depending bolt enterable into the slot therein attendant to driving said tractor in between said side frame.

References Cited in the file of this patent

UNITED STATES PATENTS

| | | |
|---|---|---|
| 2,353,949 | Warren | July 18, 1944 |
| 2,479,048 | Machin | Aug. 16, 1949 |
| 2,482,365 | Pokorny | Sept. 20, 1949 |
| 2,485,139 | Coats | Oct. 18, 1949 |
| 2,489,629 | Ford | Nov. 29, 1949 |
| 2,495,143 | Simmonds | Jan. 17, 1950 |
| 2,495,144 | Simmonds | Jan. 17, 1950 |
| 2,723,039 | Stueland | Nov. 8, 1955 |